United States Patent
Becker et al.

(10) Patent No.: US 6,719,460 B1
(45) Date of Patent: Apr. 13, 2004

(54) SWASH-PLATE DRAG BEARING

(75) Inventors: Klaus Becker, Herzogenaurach (DE); Boris Baumann, Hanau (DE)

(73) Assignee: INA Walzlager Schaeffler oHG (DE)

( * ) Notice: Subject to any disclaimer, the term of this patent is extended or adjusted under 35 U.S.C. 154(b) by 0 days.

(21) Appl. No.: 10/018,077

(22) PCT Filed: May 16, 2000

(86) PCT No.: PCT/EP00/04357
§ 371 (c)(1),
(2), (4) Date: Dec. 20, 2001

(87) PCT Pub. No.: WO00/75511
PCT Pub. Date: Dec. 14, 2000

(30) Foreign Application Priority Data

Jun. 7, 1999 (DE) .......................... 199 25 834

(51) Int. Cl.⁷ .......................... F16C 19/50; F16C 33/46
(52) U.S. Cl. .......................... 384/550; 384/2
(58) Field of Search .......................... 384/2, 550; 74/60; 417/227.1, 269; 91/505, 506; 92/12.2

(56) References Cited

U.S. PATENT DOCUMENTS

| | | | |
|---|---|---|---|
| 4,029,367 A | * 6/1977 | Schwede et al. | 384/2 |
| 4,856,917 A | * 8/1989 | Schröder et al. | 384/2 |
| 4,858,480 A | * 8/1989 | Rohde et al. | 74/60 |
| 4,884,902 A | * 12/1989 | Kispert et al. | 384/2 |
| 5,024,143 A | * 6/1991 | Schniederjan | 92/12.2 |
| 5,383,391 A | * 1/1995 | Goade et al. | 92/12.2 |
| 5,390,584 A | * 2/1995 | Fritz et al. | 92/12.2 |
| 5,630,352 A | * 5/1997 | Todd | 384/2 |

FOREIGN PATENT DOCUMENTS

| | | |
|---|---|---|
| DE | 3322860 | 1/1984 |
| DE | 87105145 | 11/1987 |
| DE | 19646231 | 5/1998 |
| EP | 0237750 | 9/1937 |
| NL | 109636 | 9/1964 |
| WO | 8603547 | 6/1986 |

* cited by examiner

*Primary Examiner*—Thomas R. Hannon
(74) *Attorney, Agent, or Firm*—Muserlian, Lucas and Mercanti

(57) ABSTRACT

An arc-shaped rolling bearing segment (14) comprising a cage (16) and rolling elements (15) for a swash plate pivoting bearing of a hydraulic axial piston machine is characterized in that the cage (16) and the support peg (17) are made as a single piece out of a polymer material, and the support peg (17) is surrounded, at least over a part of its axial length, by a metal ring (18).

4 Claims, 3 Drawing Sheets

SWASH-PLATE DRAG BEARING

FIELD OF THE INVENTION

The invention concerns a swash plate pivoting bearing for a hydraulic axial piston machine in which rolling bearing segments are arranged between a hollow cylindrical bearing surface for the swash plate in a housing and a cylindrical bearing surface on the swash plate, which rolling bearing segments are retained in arc-shaped cages that are configured as solid cages and comprise a support peg for re-positioning the cage upon displacement from a desired position, said support peg extending parallel to the rolling element pockets and projecting beyond the cage width while being connected to a readjusting device.

BACKGROUND OF THE INVENTION

In this known type of structure, a readjusting device associated to the swash plate pivoting bearing prevents the cage that receives the rolling bearing elements from slipping out of its predetermined region of movement, namely its favorable position in the pivoting bearing. In the absence of a readjusting device such slipping is possible because the rolling bearing elements not only execute rolling movements but also sliding movements due to rapid pivoting and/or vibrations and/or the mass inertia of the rolling bearing segment that lead to a positional displacement of the rolling element segment. This results in an unfavorable position of the retaining segment or segments relative to the direction of load.

Such swash plate pivoting bearings with different types of readjusting devices are described, for example, in DE-OS 28 26 928, DE-AS 25 21 312 or EP 01 82 354 B1. These readjusting devices require a point of articulation on the arc-shaped cage. From DE-GM 87 10 514, it is known in this connection to provide a bore in the cage and insert a metal pin into this bore which is then in contact with the readjusting device. A drawback of such arrangements is that in cage segments of small radial overall dimensions, this pin cannot be accommodated in the cage for lack of space.

SUMMARY OF THE INVENTION

The object of the invention is therefore to provide an improved cage of the pre-cited type in which, with the help of simple measures, the support peg can be arranged securely, reliably, and inexpensively on the cage, and the occurring restoring forces do not cause a wear of the cage.

The invention achieves this object by the fact that the cage and the support peg are made as a single piece out of a polymer material, and the support peg is surrounded, at least over a part of its axial length, by a metal ring.

By the configuration of the arc-shaped cage according to the invention it is assured that one-piece cages including the actual cage segment and the support peg can be produced without any problem in any desired size and dimensions. The metal ring connected to the support peg assures on the one hand that the cage segment has an adequate resistance to the contact pressure at its point of contact with the readjusting device and, on the other hand, that an adequate wear resistance to the sliding motion between the support peg and the readjusting device is created. Thus, the metal ring serves as a wear protector because, upon a direct contact of the support peg with the readjusting device, a considerable wear of the polymer material would take place at the point of contact. In addition, compared to the polymer material, the metal ring has a considerably higher permissible surface pressure.

Advantageous embodiments of the invention are described as follows. The metal ring is made of a steel material and subjected to a heat treatment. With this heat treatment, the steel material can be endowed with substantially higher strength values. The metal ring can comprise a projection on its inner peripheral surface and the metal ring can comprise a projection on its inner peripheral surface and the positive engagement thus formed creates an inseparable connection between the support peg and the metal ring. The metal ring may comprise a depression at least on a part of its periphery which radially inward oriented depression assures on the one side, as described above, that a positive connection is formed between the support peg and the metal ring, and on the other side, that the readjusting device can be reliably guided in the depression on the outer peripheral surface of the metal ring. Finally, the metal ring is sprayed over on its inner end face with cage material.

The invention will now be described more closely with reference to the following examples of embodiment.

DETAILED DESCRIPTION OF THE DRAWINGS

Figure 6:
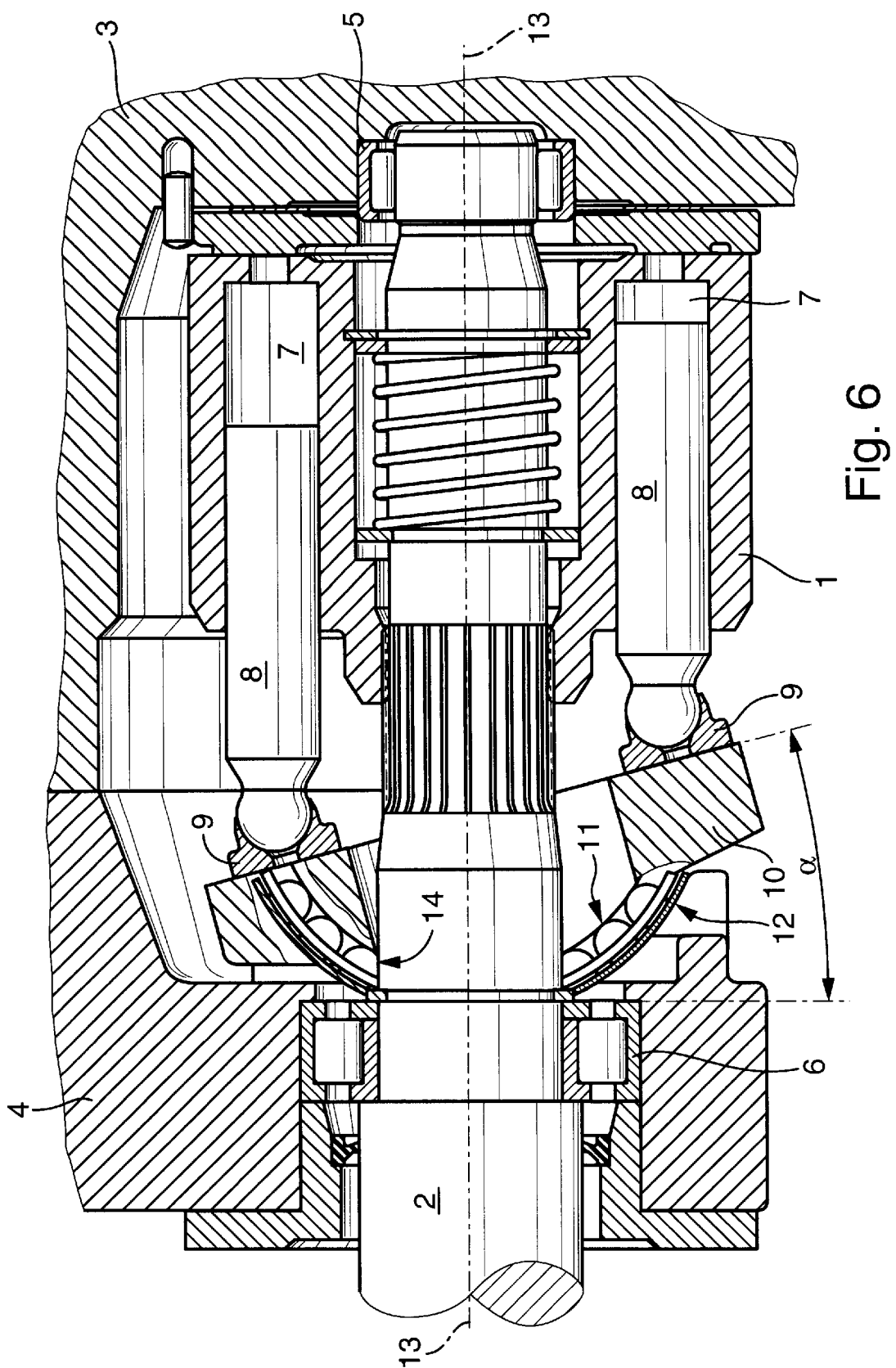
FIG. 6 shows a longitudinal section through a hydraulic axial piston machine.

As can be seen in FIG. 6, the axial piston machine comprises a cylindrical drum 1 that is arranged on a shaft 2 which can be a driving or a driven shaft depending on whether the machine is used as a pump or a motor. The shaft 2 is retained by bearings 5 and 6 in a housing made up only of the housing parts 3 and 4. Pistons 8 are arranged in cylindrical bores 7 within the cylindrical drum 1 and are supported through sliding shoes 9 on the swash plate 10. The swash plate 10 comprises the cylindrical bearing surface 11 which is situated opposite the hollow cylindrical bearing surface 12 in the housing part 4. The stroke of the pistons 8 in the cylindrical bores 7 is varied in a known manner by changing the angular position α of the swash plate 10 relative to the axis 13 of the shaft 2. For effecting this, an adjusting device, not shown, is applied, for example, to a lever, also not shown, that is firmly connected to the swash plate 10.

Figure 1:
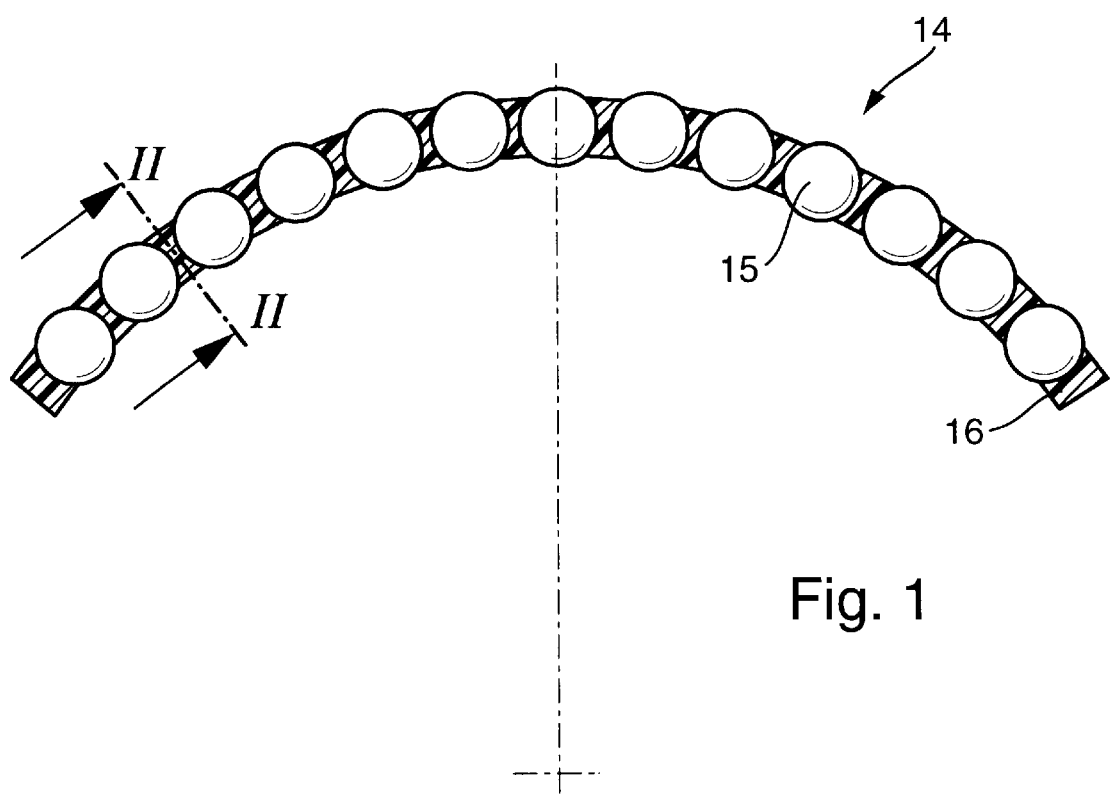
FIG. 1 shows a radial section through an arc-shaped rolling bearing segment.
Figure 2:
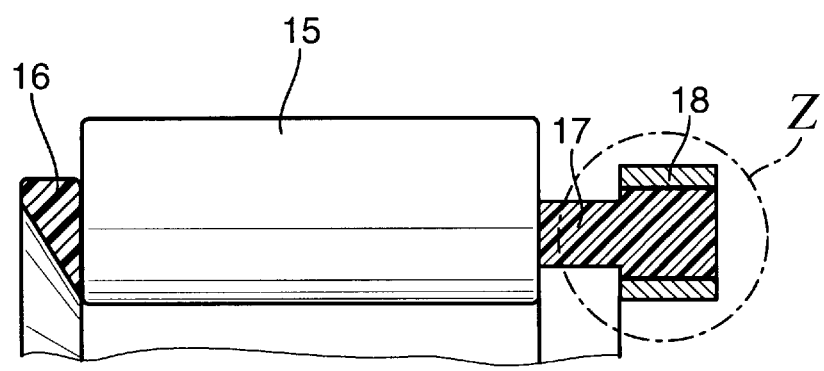
FIG. 2 shows a section taken along ling II—II of FIG. 1.
Figure 3:
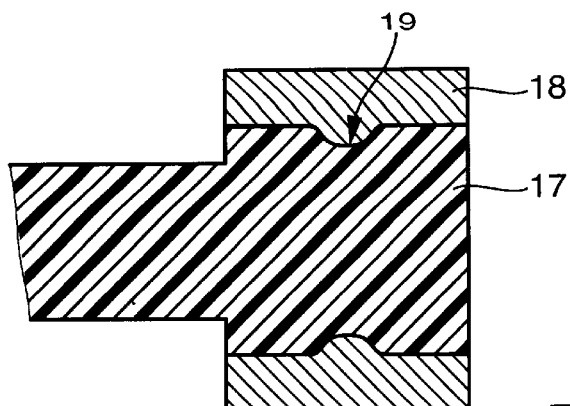
FIGS. 3, 4 and 5 are enlarged representations of the detail Z of FIG. 2.
Figure 4:
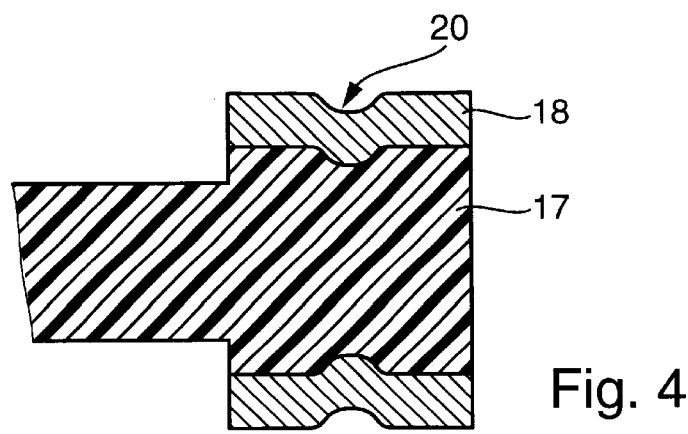
Figure 5:
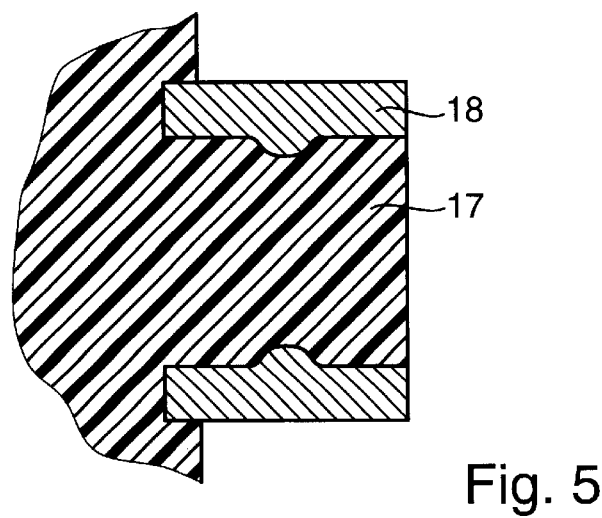

The rolling bearing segment 14 shown in FIG. 1, whose rolling elements 15 are guided and retained by the cage 16, is arranged in the bearing gap between the bearing surfaces 11 and 12. As can best be seen in FIGS. 2, 3, 4 and 5, the cage 16 is connected on the right to the support peg 17 which is surrounded on a part of its axial length by the metal ring 18. According to FIGS. 3 and 4, this metal ring 18 may comprise a radially inward directed projection 19 so that a positive engagement is formed between the metal ring 18 and the support peg 17. As FIG. 4 further shows, the metal ring 18 may also comprise a depression 20 extending at least over a part of its outer peripheral surface, into which depression 20, the readjusting device can engage if required. Finally, FIG. 5 shows a metal ring whose left-hand inner end face is sprayed over with material of the cage.

What is claimed is:

1. A swash plate pivoting bearing for a hydraulic axial piston machine in which rolling bearing segments (14) are arranged between a hollow cylindrical bearing surface (12) for the swash plate (10) in a housing (4) and a cylindrical bearing surface (11) on the swash plate (10), which rolling bearing segments (14) are retained in arc-shaped cages (16) that are configured as solid cages and comprise a support peg (17) for repositioning the cage (16) upon displacement from a desired position, said support peg (17) extending parallel to the rolling element pockets and projecting beyond the cage width while being connected to a readjusting device, characterized in that the cage (16) and the support peg (17) are made as a single piece out of a polymer material, and the support peg (17) is surrounded, at least over a part of its axial length, by a metal ring (18) which comprises a projection (19) on its inner peripheral surface.

2. A swash plate pivoting bearing according to claim 1, characterized in that the metal ring (18) is made of a steel material and subjected to a heat treatment.

3. A swash plate pivoting bearing according to claim 1, characterized in that the metal ring (18) comprises a depression (20) at least on a part of its outer peripheral surface.

4. A swash plate pivoting bearing according to claim 1, characterized in that the metal ring (18) is sprayed over on its inner end face with cage material.

* * * * *